(12) United States Patent
Kabalin

(10) Patent No.: US 10,588,388 B2
(45) Date of Patent: Mar. 17, 2020

(54) SOFT-SIDED CONTAINER WHEEL ASSEMBLY

(71) Applicant: Paul Kabalin, Jupiter, FL (US)

(72) Inventor: Paul Kabalin, Jupiter, FL (US)

( * ) Notice: Subject to any disclaimer, the term of this patent is extended or adjusted under 35 U.S.C. 154(b) by 0 days.

(21) Appl. No.: 16/244,630

(22) Filed: Jan. 10, 2019

(65) Prior Publication Data

US 2019/0216193 A1    Jul. 18, 2019

Related U.S. Application Data

(60) Provisional application No. 62/615,564, filed on Jan. 10, 2018.

(51) Int. Cl.
| | |
|---|---|
| *A63C 5/14* | (2006.01) |
| *A45C 5/14* | (2006.01) |
| *A45C 7/00* | (2006.01) |
| *A45C 13/26* | (2006.01) |
| *A45C 13/10* | (2006.01) |
| *B65D 81/38* | (2006.01) |
| *B62B 5/06* | (2006.01) |
| *B62B 1/16* | (2006.01) |
| *A45C 11/20* | (2006.01) |
| *B60B 3/00* | (2006.01) |

(52) U.S. Cl.
CPC .............. *A45C 5/14* (2013.01); *A45C 7/0077* (2013.01); *A45C 11/20* (2013.01); *A45C 13/103* (2013.01); *A45C 13/262* (2013.01); *B62B 1/16* (2013.01); *B62B 5/067* (2013.01); *B65D 81/3813* (2013.01); *A45C 2013/1015* (2013.01); *A45C 2013/267* (2013.01); *B60B 3/00* (2013.01); *B60B 2380/12* (2013.01)

(58) Field of Classification Search
CPC ....... A45C 5/14; B60B 2200/43; B60B 37/10; B62B 1/16
See application file for complete search history.

(56) References Cited

U.S. PATENT DOCUMENTS

| | | | |
|---|---|---|---|
| 320,554 A | 6/1885 | Harmon | |
| 481,963 A | 9/1892 | Minor | |
| 4,160,495 A | 7/1979 | Conrad | |
| 4,322,869 A | 4/1982 | Jordan | |
| 6,076,641 A * | 6/2000 | Kinzer | A45C 5/14 16/18 CG |
| 8,418,316 B2 * | 4/2013 | Chen | B60B 7/02 16/18 R |
| 2010/0187781 A1 * | 7/2010 | Coetzee | A47C 1/146 280/30 |
| 2011/0248551 A1 * | 10/2011 | Scicluna | B60B 1/006 301/37.26 |
| 2014/0182990 A1 * | 7/2014 | King | A45C 13/262 190/18 A |
| 2016/0023349 A1 * | 1/2016 | Hoppe | A45C 7/0045 280/655.1 |
| 2018/0065478 A1 * | 3/2018 | Ruscak | B60K 7/00 |

* cited by examiner

*Primary Examiner* — John D Walters
*Assistant Examiner* — James J Triggs
(74) *Attorney, Agent, or Firm* — McHale & Slavin, P.A.

(57) ABSTRACT

A soft sided container with a wheel assembly securable to the sidewalls of the container. The wheel assembly is formed from a cage bearing rotatably coupled to a hub. The hub, formed integral with a base plate, engages an internally positioned mounting plate, eliminating the need for a cross axle. The use of a large hub limits rotation to an outer circumference of the wheel assembly.

9 Claims, 8 Drawing Sheets

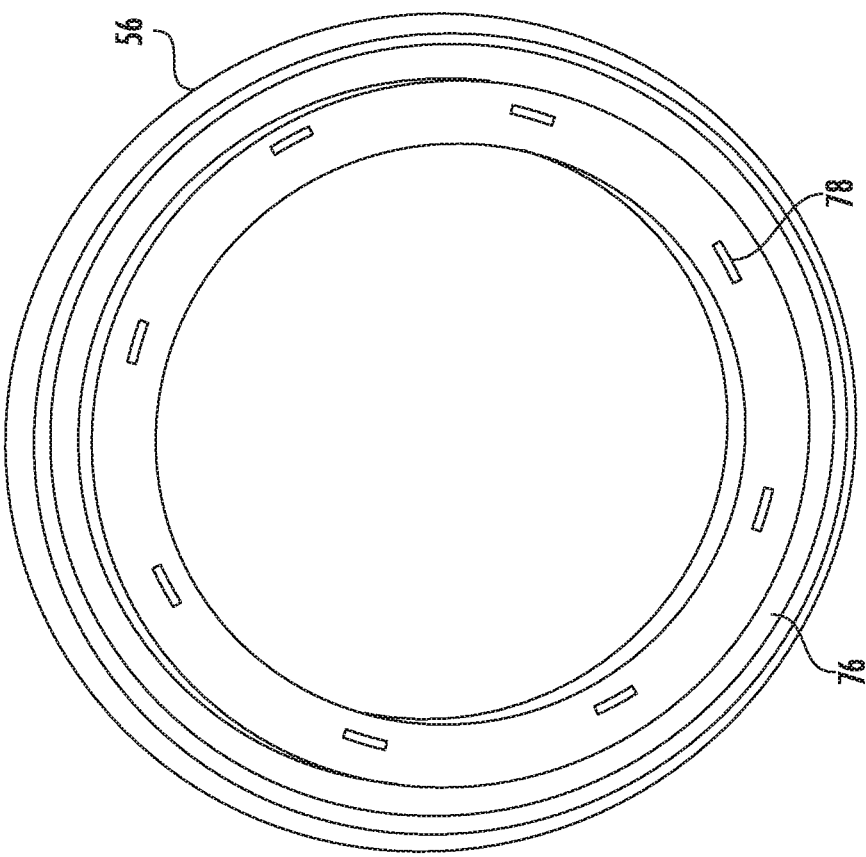
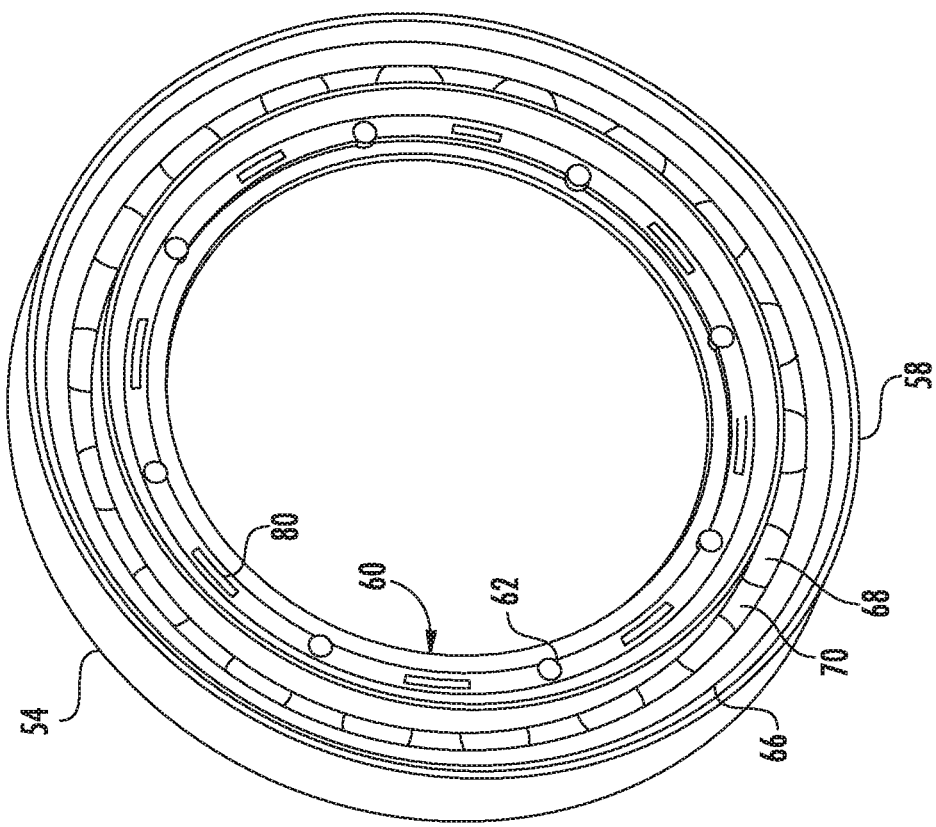

SOFT-SIDED CONTAINER WHEEL ASSEMBLY

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/615,564 entitled "SOFT-SIDED CONTAINER WHEEL ASSEMBLY", filed Jan. 10, 2018. The contents of the above referenced application are incorporated herein by reference.

FIELD OF THE INVENTION

This invention relates to the field of soft sided containers and, in particular, to a wheel assembly for use on a portable soft-sided container.

BACKGROUND OF THE INVENTION

Soft-sided containers, both insulated and non-insulated, are well known in the industry. Soft-sided containers commonly include a fabric covering, providing advantages over hard-sided containers. Hard-sided insulated containers tend to be made of plastic, with an inner layer and an outer layer, and an insulation space therebetween.

A soft-sided insulated container relies on an external insulated wall structure that is not substantially rigid. The sidewall may be foldable between a collapsed and an expanded configuration. The wall structure includes an outside layer of webbing or fabric, an inside layer of webbing or fabric, and a layer of flexible insulation therebetween, positioned between the inner and outer layers. Soft-sided coolers sometimes include substantially rigid liners to assist in permitting the cooler to maintain a given shape, or to protect items inside the cooler from being crushed.

Soft-sided containers can be made to fold, making it easier to fit into a sized opening for compact storage when not in use. The lid of a soft-sided container relies upon a zipper or hook & loop material for closure, the closure mechanism covering three of the four side walls, the fourth side being hinged. Even if insulated, the soft sides can be made to compress into a small footprint, making storage more convenient. Further, if a soft-sided container impacts another object, damage can be avoided since the soft-sided container operates as the give-way object, thereby absorbing the impact forces. For instance, a soft-sided insulated container is preferred by astute boat owners since the movement on a boat will likely cause the insulated cooler to move and impact part of the boat. Having a soft-sided shell on the insulated container reduces or eliminates the expected damage, as the container will absorb the damaging forces. In addition, soft-sided containers are generally lightweight and can be made both durable and attractive.

While the soft-sided container has numerous advantages, a disadvantage is prevalent if the soft-sided container is loaded with heavy items. Unlike rigid-sided containers, wheels with a cross axle are not practical since it defeats compressibility of the soft-sided container. This leaves the individual using the soft-sided container to carry, drag, or place the soft-sided container on another container that has wheels.

What is needed in the industry is a soft-sided insulated container having a wheel assembly that provides wheeled support of the container without a cross axle.

SUMMARY OF THE INVENTION

Disclosed is a wheel assembly that is securable to each side wall of a soft-sided container. The container comprises a body defining an insulated chamber therewithin. A cover is positionable over an upper edge of the body, with a zipper mechanism securing access to the insulated chamber when the cover is in a closed position, and allowing access to the insulated chamber when said cover is in an open position. The wheel assemblies of the instant invention are secured to opposing side walls and formed from a wheel rotatably coupled to a hub. The hub is formed integral with a mounted plate that is secured to each sidewall.

An objective of the invention is to provide a wheel assembly for a soft sided insulated container.

Another objective of the invention is to provide a wheel assembly that conceals movement of the wheel, except along an outer circumference of the wheel assembly.

Still another objective of the invention is to provide a wheel assembly having an oversized hub to provide a higher distribution of loading and a pleasing design.

Yet another objective of the invention is to provide a wheel assembly that can be used on a foldable or non-foldable container.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 7 is a plane view of the cage bearing;

FIG. 8 is an inner side plane view of the trim ring;

DETAILED DESCRIPTION OF THE PREFERRED EMBODIMENT

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
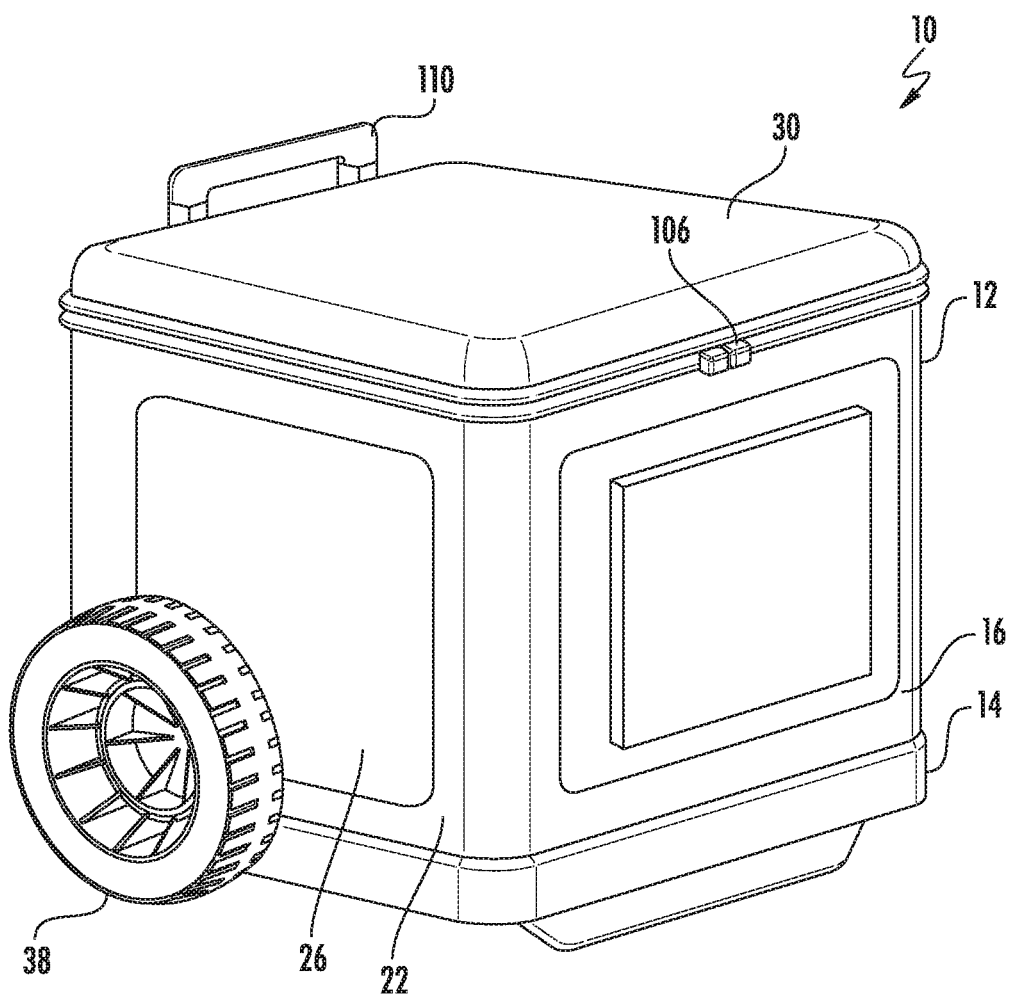
FIG. 1 is a front right side perspective view.
Figure 2:
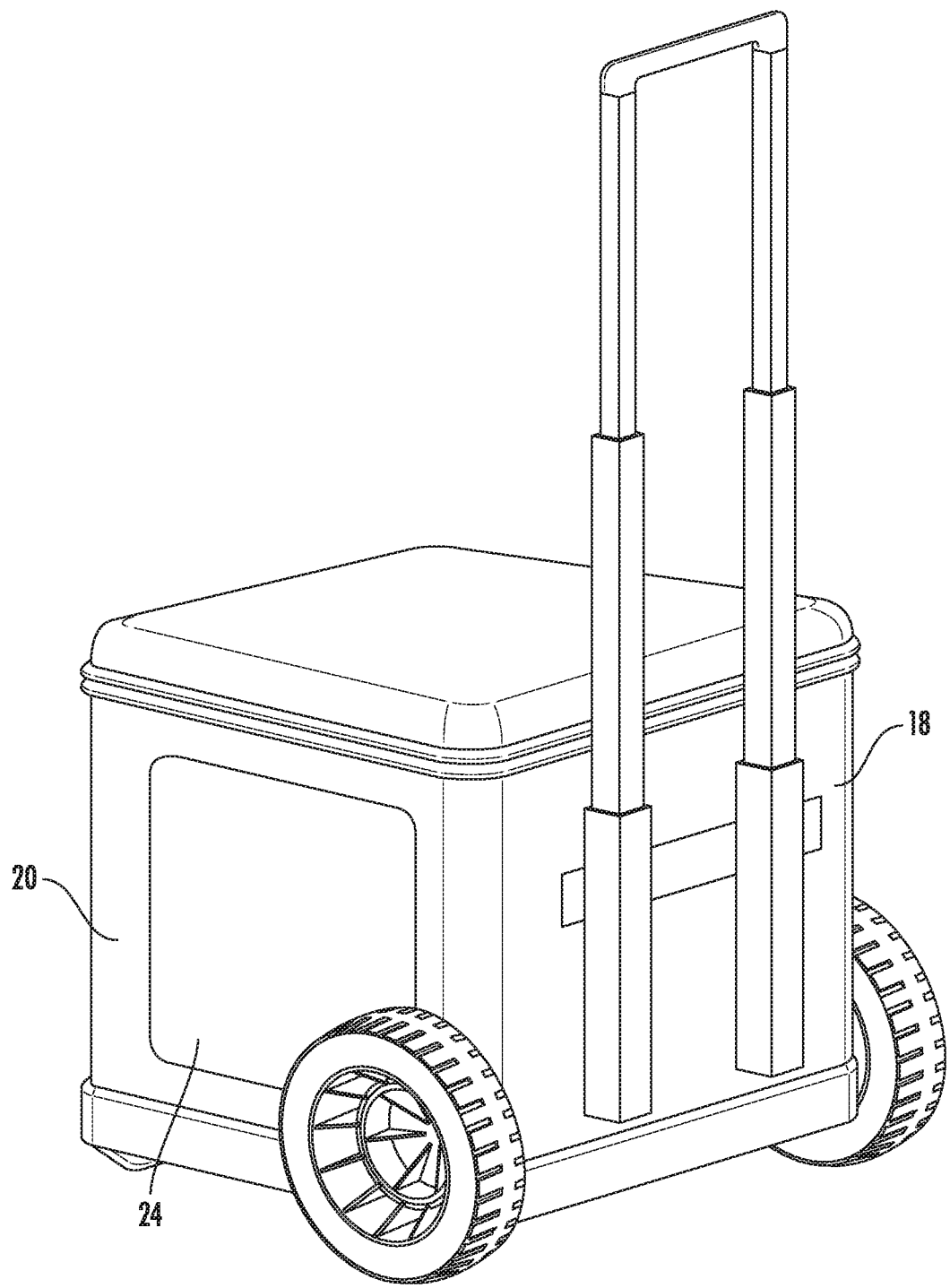
FIG. 2 is a rear left side perspective view with the cover closed.
Figure 3:
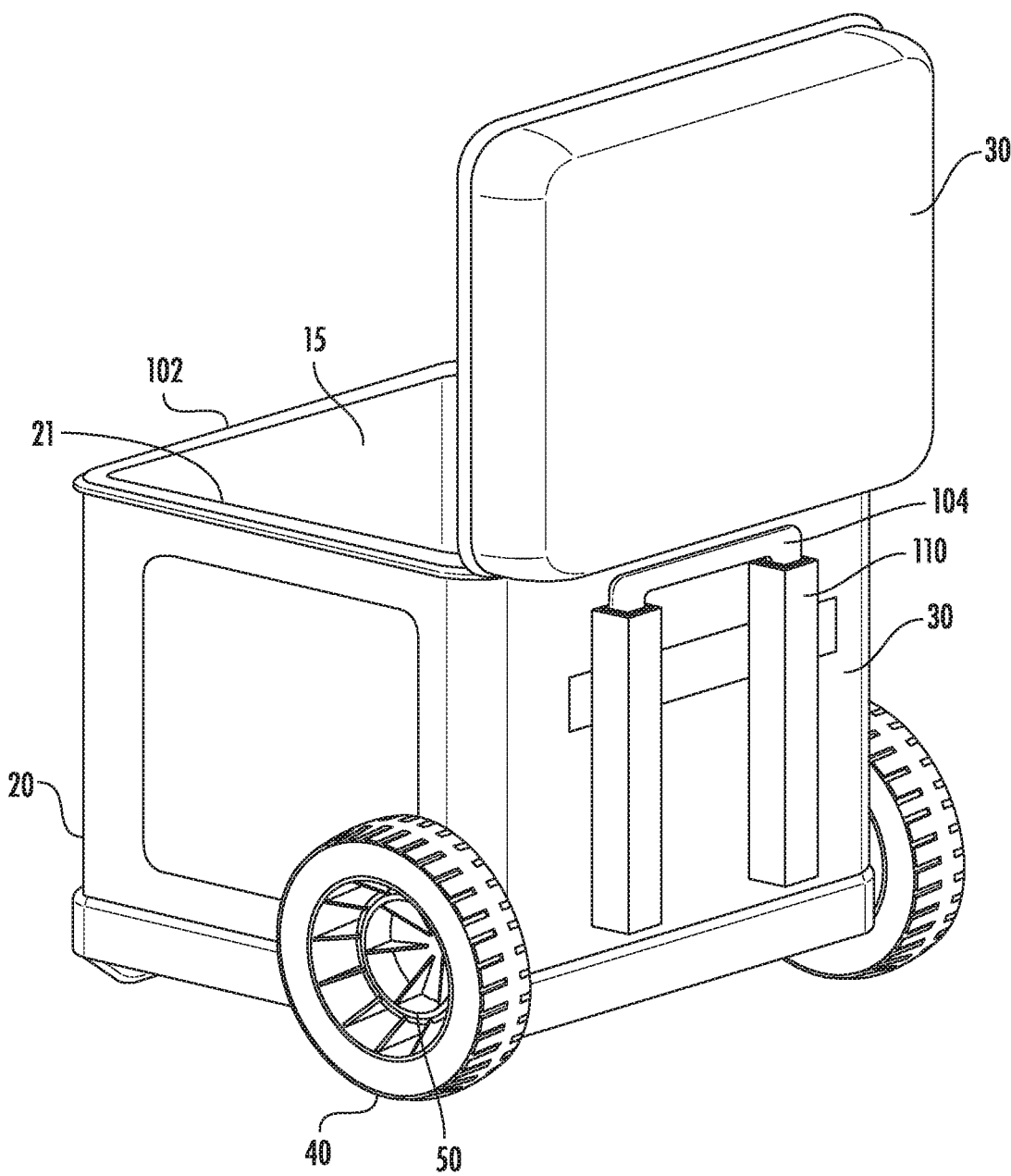
FIG. 3 is a rear left side perspective view with the cover open.
Figure 4:
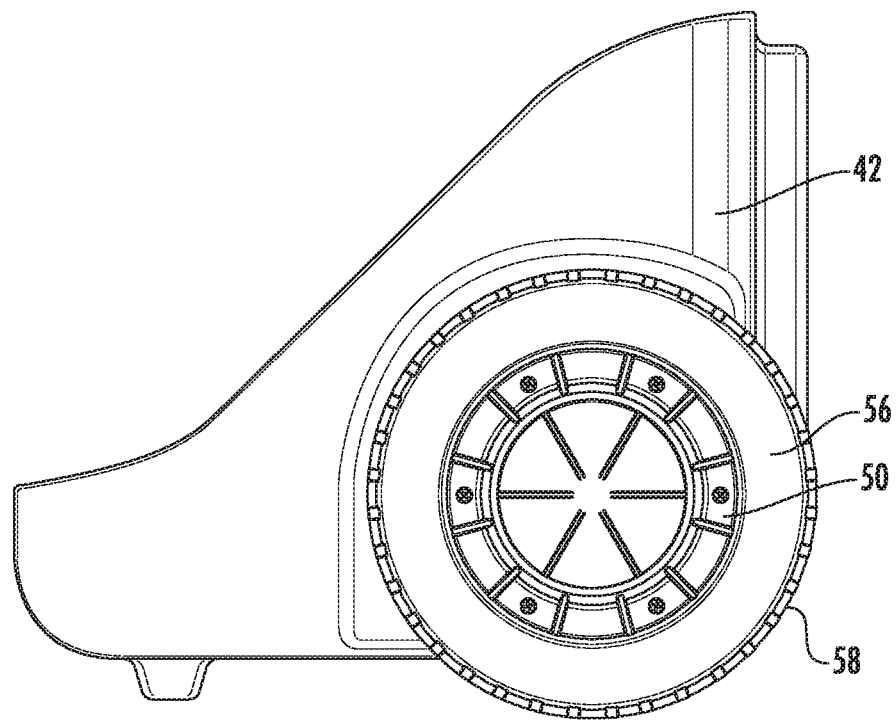
FIG. 4 is a plane view of a wheel assembly.
Figure 5:
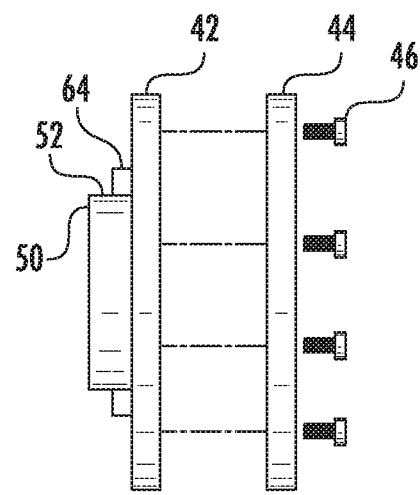
FIG. 5 is a cross sectional side view of a mounting plate and support plate.
Figure 6:
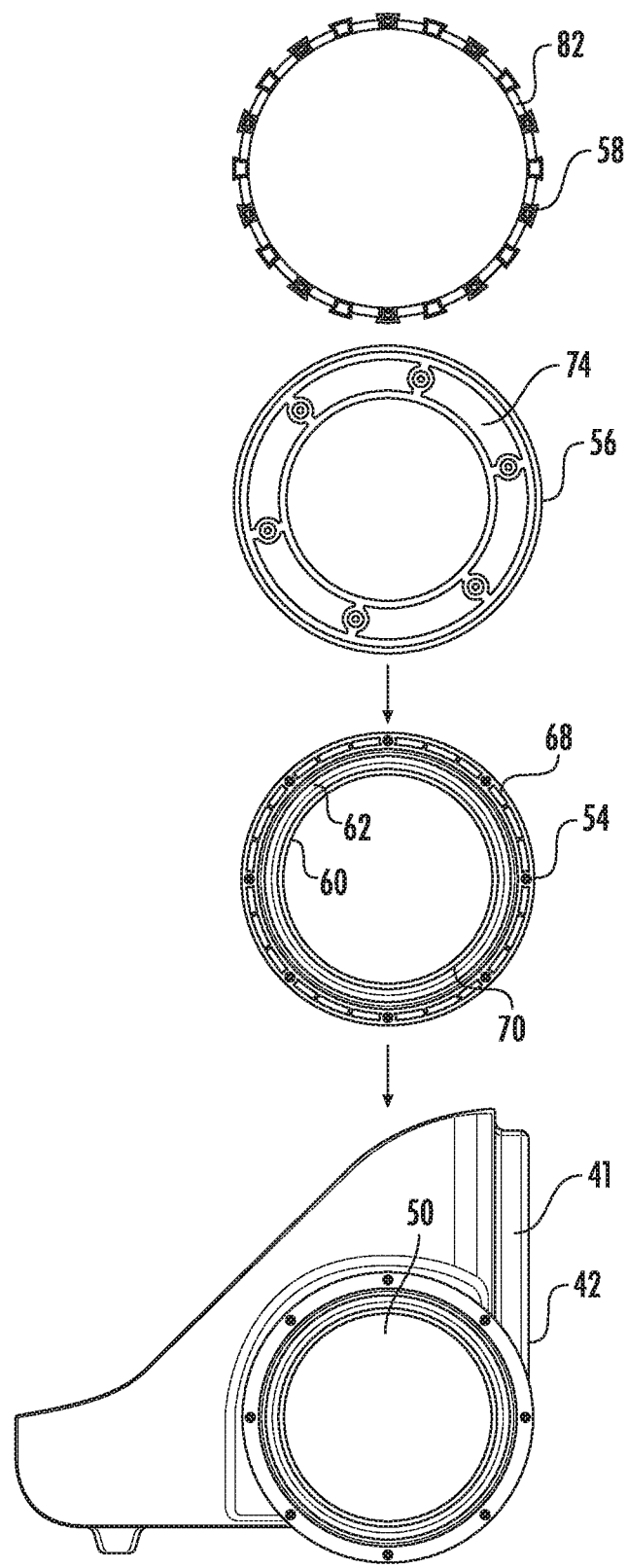
FIG. 6 is an exploded view of the mounting plate and support plate.

Referring to FIGS. 1-3, a body 12 defining an insulated chamber 15 therewithin is illustrated, said body having a base 14, a front wall 16 extending upward from the base 14, a rear wall 18 extending upward from the base 14, a left side wall 20 extending upward from the base 14 between the front wall 16 and rear wall 18, and a right side wall 22 extending upward from the base 14 between the front wall 16 and rear wall 18. The left and right side walls 20, 22 are opposing each other and, in the preferred embodiment, include mesh storage pockets 24, 26. Depending upon the size and intended use of the soft-sided container, the base may be constructed of a rigid material to provide support when transporting heavy items. The soft-side walls extend upward from the base 14. For example, the base 14 may be a thermoplastic shell, and the upstanding side walls may be constructed of canvas or the like. The side walls are not substantially rigid and may be foldable between a collapsed and an expanded configuration. Alternatively, the container is not foldable, wherein the axle-less wheel assembly still provides a benefit in that the interior of the container is not partially consumed with an axle tunnel.

In the preferred embodiment, the wall structure includes an outside layer of webbing or fabric, an inside layer of webbing or fabric, and a layer of flexible insulation sandwiched therebetween. The problem with the prior art, which this invention addresses, is the flexibility of the side walls making attachment of a wheel assembly difficult. While conventional coolers can accept an axle between the wheels, in most instances, a soft-sided container does not have sufficient room to receive an axle. In addition, the use of an axle can prevent various folding angles otherwise available to a soft-sided container. In many instances, the base 14 is made of a flexible material that does not accept an axle without consuming space within the interior cavity of the container.

Referring to FIGS. 4-8, the container includes a first wheel assembly 40 having a base plate 42 that is placed on the outer side surface of left side wall 20. A mounting plate 44 is placed on the inner side surface 21 of the left side wall 20. The base plate 42 is attached to the mounting plate 44 by fasteners 46, which in the preferred embodiment are screws. Alternatively, the base plate 42 and mounting plate 44 may include insert and receptacle sockets and glue, or combinations thereof. The base plate 42 is constructed and arranged to distribute loading forces over a large portion of the side wall. Unique to this invention is the use of a large supporting, integrally formed hub 50 having an outer periphery 52 that is substantially the same size as a cage bearing 54 and trim ring 56, forming a wheel that can hold a non-marring tire like material 58. The outer periphery 52 receives the cage bearing 54, which consists of an inner rim 60 having a plurality of projections 62 for securing to a socket 64 formed in said base plate 42 around the outer periphery 52. The cage bearing 54 further includes an outer rim 66 that is rotatable around a plurality of ball bearings 68 spaced apart by a ball bearing holder 70. The ball bearing holder 70 allows the outer rim 66 to spin independently of the inner rim 60. The tire 58 is frictionally secured to the outer rim 66 that forms a wheel of the cage bearing 54. The tire 58 is preferably made of a rubber or like compound, which allows rolling over hard surfaces with very little noise. A trim ring 56 has an outer surface 74 and an inner surface 76 containing a plurality of attachment tabs 78 insertable into cage bearing receptacles 80 on the cage bearing. The trim ring 56 conceals the cage bearing 54, wherein the only rotatable item viewable is the tire 58. The tire 58 can be smooth or include treads 82 that operate to further quiet the container noise when rolled across a hard surface. The right wheel assembly 38 forms a mirror image of the left wheel assembly with the same internal elements; for this reason, the elements of the right wheel assembly are to be interpreted as forming an exact mirror image of the left wheel assembly. It should be noted that the base plate 42 may include a curvature that can wrap around a portion of the back wall 18. In such instances, the reinforcement of the base 14 may be reduced to a minimum. The hub 50 and the mounting plate 44 are preferably injection molded as a single piece.

A cover 30 is positionable over the upper edge 102 of the front and side walls. The cover 30 is integrally attached to the rear wall 18, wherein the material is formed into a living hinge 104. A closure mechanism 106 is attached to the upper edge 102 of the right wall 22, front wall 16, and left wall 20. In the preferred embodiment, the closure mechanism is a zipper which provides securing access to the insulated chamber 15 when the cover 30 is in a closed position, and allows access to the insulated chamber 15 when the cover 30 is in an open position. Alternatively, the closure mechanism 106 is a hook and loop material (VELCRO®). A retractable handle 110 is secured to the rear wall 18. The handle 110 has a plurality of extensions, allowing the handle to be extended for use in moving the container as depicted in FIG. 2, or stored in a compact arrangement as depicted in FIG. 3.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

Figure 9:
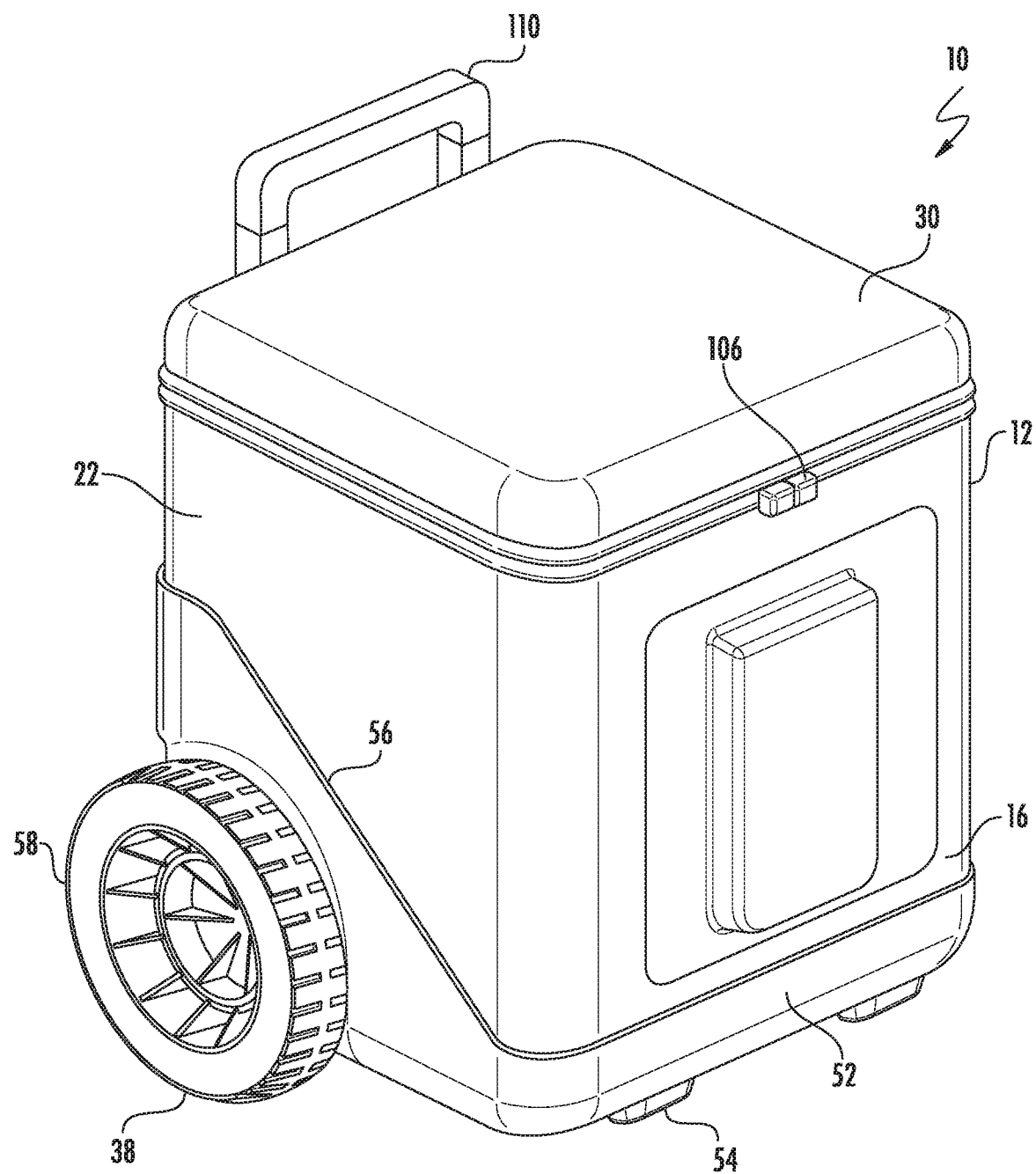
FIG. 9 is a front right side perspective view of an embodiment having a tray base.
Figure 10:
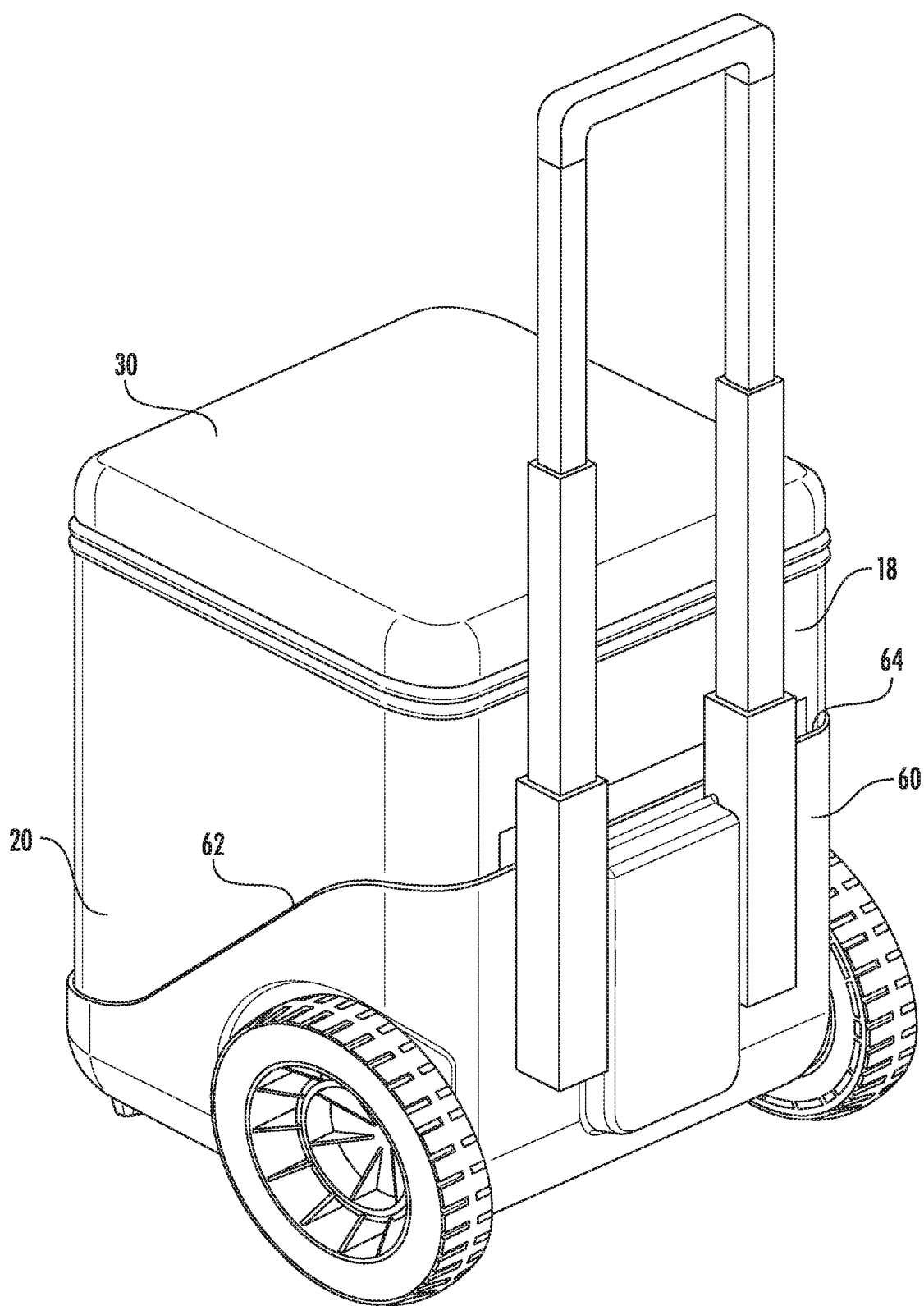
FIG. 10 is a rear left side perspective view of FIG. 9.

Referring to FIGS. 9 and 10, disclosed is an embodiment having a tray base 50. The tray base forms a substantially flat floor of the container interior floor. The frontal area 52 of the tray base 50 includes a stand 54, allowing the container to sit level when not in use. The tray base 50 has a curvature edge 56 that extends around the outer circumference 58 of the wheel assembly 38, allowing the wheel assembly 38 to be secured directly to the tray base 50. As previously mentioned, the wheel assembly is coupled directly to the side wall 22, eliminating the need for a transaxle. The curvature edge 56 of the right side wall 22 continues around the back and to the left side wall 20 to curvature edge 62. The curvature edges are connected by a cross edge 64 forming a top of the rear tray area 60, allowing the tray base 50 to support high weights, as the tray base provides a rigid support of the bottom of the container and large portion of the back wall 18.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

What is claimed is:

1. A portable soft-sided insulated container comprising:
   a body defining an insulated chamber therewithin, said body having a base, a front and rear wall extending upward from said base, opposing left and right side walls extending upward from said base between said front and rear walls;
   a cover positionable over an upper edge of said walls, said cover hingedly attached to said rear wall;
   a closure mechanism attached to said upper edge of said right wall, said front wall and said left wall, said closure mechanism securing said cover to body while in a closed position and allowing access to said insulated chamber when said cover is positioned in an open position;
   a wheel assembly secured to each said side wall, said wheel assembly including a base plate positioned on an outer surface of each said side wall and securable to a mounting plate positioned on an inner surface of each said side wall, said base plate including an integral hub supporting a cage bearing rotatably secured to a trim ring forming a wheel.

2. The portable soft-sided insulated container according to claim 1 wherein said cage bearing consists of an inner rim having a plurality of projections for securing to a socket formed in said base plate.

3. The portable soft-sided insulated container according to claim 2 wherein said outer rim is rotatable around a plurality of ball bearings spaced apart by a ball bearing holder, wherein said ball bearing holder allows said outer rim to spin independently of said inner rim.

4. The portable soft-sided insulated container according to claim 1 including a tire like non-marring material securable to said wheel.

5. The portable soft-sided insulated container according to claim 1, wherein each said base plate is secured to said mounting plate with a plurality of fasteners.

6. The portable soft-sided insulated container according to claim 1, including a retractable handle secured to said rear wall.

7. The portable soft-sided insulated container according to claim 1 wherein said closure mechanism is a zipper.

8. The portable soft-sided insulated container according to claim 1 wherein said closure mechanism is hook and loop material.

9. The portable soft-sided insulated container according to claim 1 wherein rotation of said wheel assembly is limited to an outer circumference of said wheel assembly.

* * * * *